United States Patent
Meher et al.

(10) Patent No.: US 12,146,098 B1
(45) Date of Patent: Nov. 19, 2024

(54) CATALYST AND ACTIVATOR FOR EXOTHERMIC REACTION

(71) Applicant: Halliburton Energy Services, Inc., Houston, TX (US)

(72) Inventors: Pratiksha Shivaji Meher, Pune (IN); Amit Agrawal, Pune (IN); Jason Maxey, Spring, TX (US); Sunita S. Kadam, Pune (IN); V. Ramireddy Devarapalli, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 5 days.

(21) Appl. No.: 18/204,587

(22) Filed: Jun. 1, 2023

(51) Int. Cl.
 *C09K 8/524* (2006.01)
(52) U.S. Cl.
 CPC .................................. *C09K 8/524* (2013.01)
(58) Field of Classification Search
 None
 See application file for complete search history.

(56) References Cited

U.S. PATENT DOCUMENTS

| | | | |
|---|---|---|---|
| 10,053,614 B2 * | 8/2018 | Al-Nakhli | E21B 43/267 |
| 11,808,112 B2 * | 11/2023 | Braganza | C09K 8/524 |
| 2004/0163813 A1 | 8/2004 | Slabaugh et al. | |
| 2006/0144591 A1 * | 7/2006 | Gonzalez | E21B 29/10 |
| | | | 166/57 |
| 2006/0192039 A1 * | 8/2006 | Smith | E21B 43/04 |
| | | | 241/24.1 |
| 2008/0069961 A1 * | 3/2008 | Sarkar | E21B 43/01 |
| | | | 427/384 |
| 2010/0139924 A1 | 6/2010 | Abney | |
| 2015/0000912 A1 * | 1/2015 | Choudhary | E21B 43/24 |
| | | | 166/300 |
| 2017/0073571 A1 | 3/2017 | Salla et al. | |
| 2019/0185739 A1 | 6/2019 | Al-Nakhli et al. | |
| 2020/0355052 A1 * | 11/2020 | Al-Nakhli | E21B 43/00 |
| 2024/0010905 A1 * | 1/2024 | Meher | C09K 8/92 |

FOREIGN PATENT DOCUMENTS

WO 2008032067 A1 3/2008

OTHER PUBLICATIONS

Dayal, B. , et al., "Lithium Hydroxide/Aqueous Methanol: Mild Reagent for the Hydrolysis of Bile Acid Methyl Esters", 1990, 1 page.

(Continued)

*Primary Examiner* — John J Figueroa
(74) *Attorney, Agent, or Firm* — Kilpatrick Townsend & Stockton LLP

(57) ABSTRACT

Described herein is a combination of a catalyst and an activator and method of use for causing an exothermic reaction in a low temperature environment. The mixture can include sodium nitrite, an ammonium-based compound, a catalyst that comprises an oxidizer, and an activator and can be injected into a fluid flow path. The fluid flow path can be a pipeline, a flowline, a wellbore, or a subterranean formation. The mixture can cause an exothermic reaction in the fluid flow path and remove, using the exothermic reaction, a damaging material from the fluid flow path.

12 Claims, 7 Drawing Sheets

(56) References Cited

OTHER PUBLICATIONS

Fife, Thomas H., et al., "Divalent Metal Ion Catalysis in the Hydrolysis of Esters of Picolinic Acid—Metal Ion Promoted Hydroxide Ion and Water Catalyzed Reactions", 1985, 1 page.
Lee, Changha, et al., "Chemistry of Persulfates for the Oxidation of Organic Contaminants in Water", 2018, 15 pages.
Lian, Xiaoyan, et al., "An Efficient FeCl3-promoted 0-alkyl Cleavage of Esters to Carboxylic Acids", 2011, 1 page.
Qian, Cheng, et al., "A novel in situ N2 Generation System Assisted by Authigenic Acid for Formation Energy Enhancement in an Oilfield", 2019, 10 pages.
Suh, Junghun, et al., "Catalysis by Binuclear Zinc Ions in Ester Hydrolysis", Aug. 19, 1985, 1 page.
PCT/US2024/022739, "International Search Report and Written Opinion", Jul. 23, 2024, 13 pages.

\* cited by examiner

CATALYST AND ACTIVATOR FOR EXOTHERMIC REACTION

TECHNICAL FIELD

The present disclosure relates generally to wellbore operations and, more particularly (although not necessarily exclusively), to a catalyst and an activator for an exothermic reaction.

BACKGROUND

Wellbore operations may include various equipment, components, methods, or techniques to displace and release hydrocarbon fluids for recovery from a subterranean or sub-oceanic formation and hydrocarbon flowlines including surface and subsea pipelines. A pipeline, for example along the ocean floor, may be used to transport hydrocarbon fluids from the field or gathering systems to refineries. Hydrocarbons can flow from the formation into the tubulars of the wellbore from relatively high temperatures in the formation to somewhat lower temperatures in the tubulars or later into the flowline/pipeline where the temperature varies. The pipeline can have areas of high temperatures and areas of low temperatures. The temperature gradient within the subterranean formation, the wellbore or the pipeline can create an environment in which damaging material, such as paraffin deposits, scales, asphaltenes, waxes, and emulsions, etc., can accumulate, and the damaging material can cause issues with the flow of hydrocarbons through the wellbore or pipeline that can impact various operations.

DETAILED DESCRIPTION

Figure 1:
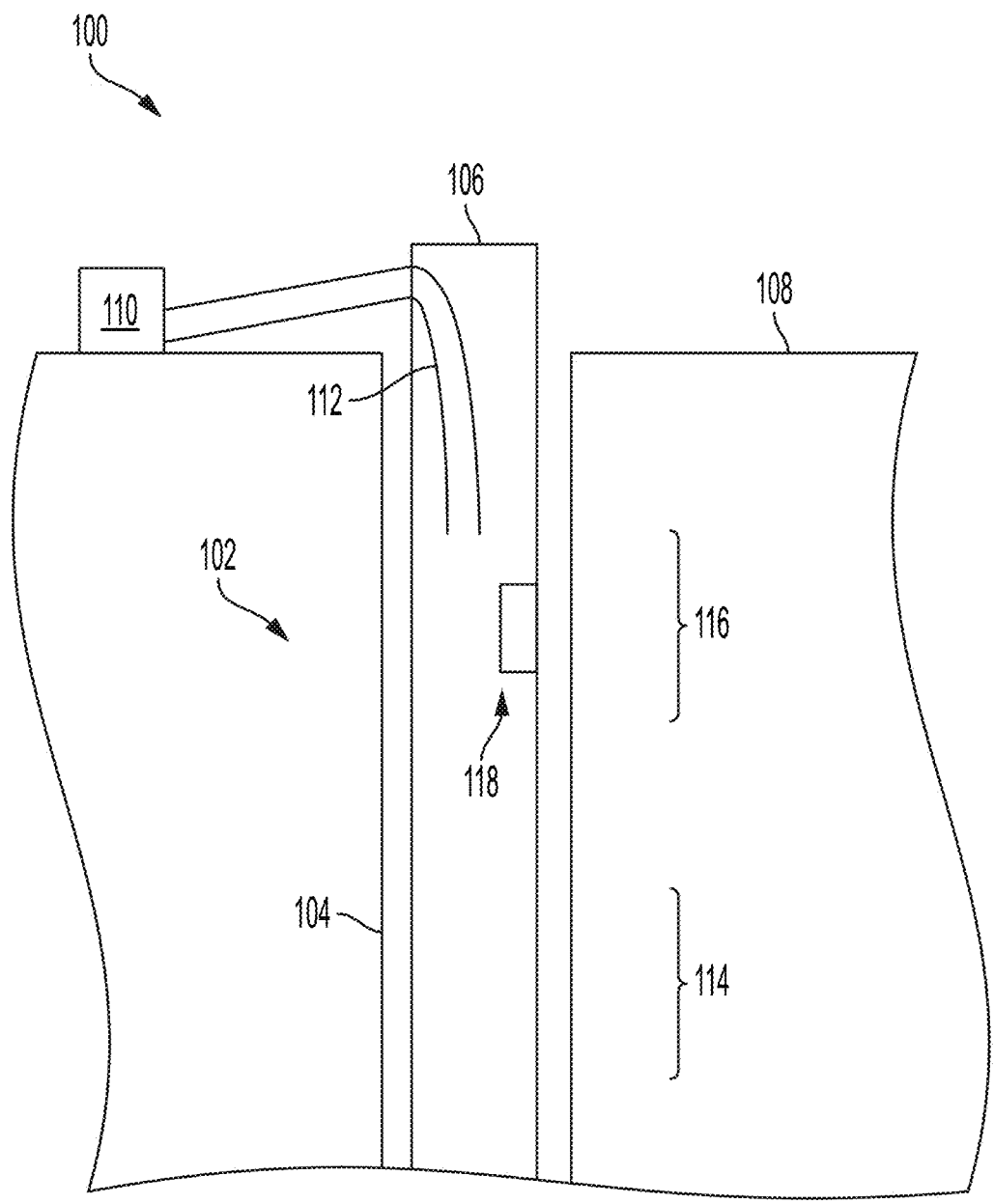
FIG. 1 is a schematic of an example of a wellbore and surface equipment for deploying an exothermic reaction mixture with a catalyst and an activator for removing damaging material from a wellbore according to one example of the present disclosure.

Certain aspects and examples of the present disclosure relate to a low temperature catalyst and an activator for initiating an exothermic reaction in target low-temperature zones of a flowline for removing damaging material. A catalyst can be used in a reaction mixture to control the rate of reaction. An activator can be added into a reaction in combination with a catalyst to enhance characteristics of the reaction such as temperature release, reaction time, and reaction rates, etc. An exothermic reaction can produce or otherwise release energy upon reacting, and the energy can be released as heat to an area surrounding the exothermic reaction. Flowline operations can include entering subterranean formations deep below the surface. For example, flowline operations can include production operations, transportation operations, oil recovery operations, drilling operations, or the like. The deep operations may include areas within the wellbore or flowlines where the temperature varies from areas of high temperature to areas of low temperature intermittently from the bottom to the top. Other operations can include fluid flowlines used in production operations or transporting of fluids across subsea lines. The low temperature zones may cause hydrocarbon fluids to form damaging material. The damaging material can include waxes, paraffin deposits, scales, asphaltenes, and the like that can restrict the flow of the hydrocarbon fluid with respect to the flowline. For example, the low temperature zones may accumulate paraffin deposits along the inner walls of the wellbore, and over time, the paraffins gradually decrease the inner diameter of the wellbore until no fluid can pass through the wellbore. The increased temperature can also help remove emulsions which have formed downhole.

Other techniques used during a wellbore operation for removing damaging material may include acid stimulation treatments for acid soluble materials. Acid soluble materials can include scale material and acid soluble plugging material such as calcium carbonate, salts and clays (soluble in hydrofluoric acid). Removing damaging material may also include the use of solvents such as xylene for removal of organic material such as paraffins or asphaltenes. Additional techniques used during a wellbore operation for removing damaging material may include methods such as the use of pumping hot oil downhole to thin down paraffins or the use of scrapers to remove material from the inner diameter of the tubulars. Devices such as pigs can be pumped through pipelines to try and remove excess material from the pipeline. The other techniques may suffer from increasing operation time, requiring additional workover, and may negatively impact the reservoir structure.

To remove damaging material without impacting the wellbore operation, an exothermic reaction mixture can be used with a low temperature catalyst and an activator. The exothermic reaction including the low temperature catalyst and activator can generate energy release in the form of an exotherm and the generation of nitrogen when used in temperatures below approximately 40° F. (4° C.). For example, during wellbore operations, incorporating the exothermic reaction mixture including the low temperature catalyst and an activator into the target zone can increase the temperature within the target zone of the wellbore while other operations are being performed. The other operations may include, for example, a production operation, a drilling operation, a completion operation, a stimulation treatment, or any other suitable operation within the wellbore. The reaction mixture can include an ammonium-based compound, sodium nitrite, a catalyst, an activator, and the reaction mixture can be injected into the wellbore at one or more target locations for raising the temperature of the surrounding environment to remove damaging material from the wellbore.

In the case where a catalyzed exothermic reaction such as that provided by the mixture of ammonium chloride ($NH_4Cl$) and sodium nitrite, the reaction can be catalyzed by the inclusion of an acid which may be encapsulated for delayed release within the reaction mixture. The acid may be encapsulated in a soluble polymer. However, the soluble polymer used to encapsulate the acid may form non-uniform layers around the acid that may vary the encapsulated acid release. A raw acid can be used to initiate the exothermic reaction; however, the raw acid may initiate the exothermic reaction instantaneously. The delayed acid release may not initiate a reaction unless the temperature is at or above approximately 70° F. (21° C.) to initiate the respective reaction. The other techniques may not be able to be used in a low temperature environment for controlling an exothermic reaction.

In some examples, raising the temperature of the fluid flowline at a target location may cause the damaging material to be removed from the target location. For example, the exothermic reaction can be initiated in the target location, and the heat from the exothermic reaction may remove the damaging material from the target location. In some examples, the exothermic reaction may not initialize below approximately 70° F. (21° C.), and the combination of a catalyst and an activator may facilitate initiation of the reaction at or below approximately 70° F. (21° C.). The reaction mixture can be controlled via the addition of buffer for delaying the release of energy allowing for targeted energy release as a delay mechanism. Additionally, or alternatively, the reaction mixture can include a surfactant for controlling the energy release.

During a wellbore operation, the tubulars of the wellbore may include areas of high temperatures and areas of low temperatures intermittently from the bottom of the wellbore to the top of the wellbore. Alternatively, during the transport or production operation, the subsea flowline or process lines may include areas of high temperatures and areas of low temperatures intermittently along the path of the flowline. When an area of low temperature within the tubular or flowline comes in contact with the hydrocarbon fluids during the wellbore operation, damaging material can build up along the inner side of the tubular or flowline and restrict the flow of hydrocarbon fluid from the wellbore. Damaging materials can include organic material and inorganic material that may negatively impact the wellbore operation. For example, damaging material can include scales, waxes, paraffin deposits, emulsions, asphaltenes, and the like. The exothermic reaction including the low temperature catalyst and activator can be used, for example, when the temperature within the wellbore is at or below approximately 70° F. (21° C.). Additionally, the combination of the low temperature catalyst, the activator and exothermic reaction can include elements that increase or decrease the rate of the reaction. The elements added to the exothermic reaction and catalyst can control the energy release from the reaction to the surrounding environment. In some wellbores or fluid flowlines, the reaction mixture and the catalyst can include a buffer, a surfactant, a solvent, or a suitable combination thereof, to affect (e.g., increase, decrease, etc.) the rate of reaction. The addition of the catalyst and other components can be deployed in the wellbore to targeted depths.

As used herein, the terms "pipeline", "flowline", "tubular", or "wellbore" are intended to refer broadly to a flow path in which the damaging material can accumulate. The flow path for example can be from within a sub-oceanic formation or subterranean formation through which a pipeline, flowline, tubular, or wellbore can be positioned. The exothermic reaction can be used in any or all combinations of the above for increasing the reaction temperature to aid in or remove damaging material from the fluid flow path.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of an example of a wellbore system 100 that can accumulate damaging material 118 according to one example of the present disclosure. The damaging material 118 can accumulate within the tubular or flowline 106 of the wellbore 104. The wellbore 104 and tubular or flowline 106 can be within a subterranean formation 102 for a wellbore operation. The tubular or flowline 106, for example, may be a pipeline, a production tubing, a casing, pup joints, drill collars, a drill pipe, or other embodiments of hydrocarbon pipes. During a wellbore operation, the wellbore 104 can be injected with fluids using fluid pumps 110 located at the surface 108. The fluid pumps 110 can be in liquid contact with the tubular or flowline 106 of the wellbore 104. The fluid pumps can be in fluid contact with the tubing 112 for targeted fluid release within the tubular or flowline 106 of the wellbore 104. The fluid pumps 110 can be controlled for changing the fluid flow pressure or flow rate within the tubing 112. In some examples, the fluid pumps 110 can be controlled by a computer to control the parameters of liquid dynamics within the wellbore 104.

The wellbore 104 can include a high temperature segment 114 and a low temperature segment 116. The low temperature segment 116 can cause the build-up of damaging material 118, such as scales, waxes, paraffins, asphaltenes, etc., that can reduce the efficiency or output of the wellbore operation within the wellbore 104. The low temperature segment 116 and high temperature segment 114 can be intermittently dispersed thought the tubular or flowline 106 within the wellbore 104 from the bottom of the subterranean formation 102 to the top of the tubular or flowline 106 within the wellbore 104. For example, the wellbore 104 may include a low temperature segment 116 located at the bottom of the subterranean formation followed by a high temperature segment 114 above the low temperature segment 116. The tubular or flowline 106 within the wellbore 104 that is within the subterranean formation 102 may have one or more low temperature segments 116 that may include the damaging material 118 adhered to the tubular or flowline 106. The one or more low temperature segments 116 can cause multiple segments within the tubular or flowline 106 to experience reduced hydrocarbon flow.

The tubing 112 can be disposed in the wellbore 104 to a targeted depth. The targeted depth can be a low temperature segment 116 within the wellbore 104. The fluid pumps 110 can inject the reaction mixture into the wellbore 104 through the tubing 112. The reaction mixture can otherwise suitably be positioned in the wellbore 104. The exothermic reaction can increase the surrounding temperature within the tubular or flowline 106 of the wellbore 104 and can remove the damaging material 118 from the wall of the tubular or flowline 106. For example, the tubing 112 can be deployed into a low temperature segment 116 in which the temperature of the wellbore 104 is at or below approximately 70° F. (21° C.). For example, the temperature of the wellbore may be about 100° F. (38° C.), about 90° F. (32° C.), about 80° F. (27° C.), about 70° F. (21° C.), about 60° F. (15° C.), or about 50° F. (10° C.). In some examples, a catalyst and an activator may be used to initiate the exothermic reaction at the low temperature. The exothermic reaction may generate energy in the form of heat to the surrounding environment of the low temperature segment 116 to increase the temperature of the tubular or flowline 106 within the wellbore 104. The increase in the temperature of the tubular or flowline 106 may remove or at least partially remove the damaging material 118 from the wall of the tubular or flowline 106. The damaging material 118 can be pumped out from the wellbore or can return to the subterranean formation 102. In some examples, the damaging material 118 can be removed or broken down such that it can be flowed from the flowline 106 using the exothermic reaction mixture and oxidizer in the low temperature segment 116 to increase the flow of hydrocarbons through the flowline 106.

Figure 2:
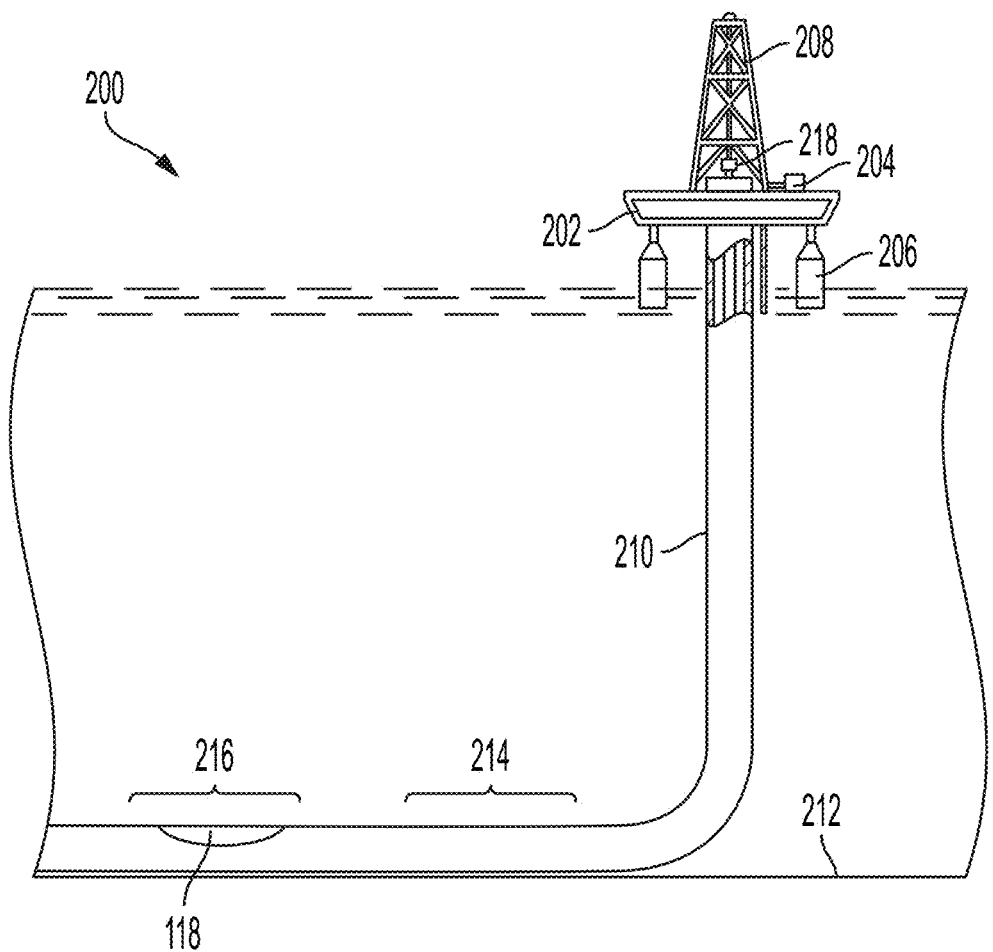
FIG. 2 is a schematic of an example of an offshore environment with a flowline for carrying fluids that can include damaging material in lower temperature segments according to one example of the present disclosure.

FIG. 2 is a schematic of an example of an offshore environment with a flowline 210 for carrying fluids according to one example of the present disclosure. The offshore environment 200 can include a floating workstation 206 that can be positioned over a submerged oil or gas flowline located along a sea floor 212. The floating workstation can include a derrick 208 and a hoisting apparatus 218 for raising and lowering tools to test the flowline 210. A pump 204 located on the deck 202 can inject fluid into the flowline 210 for removing damaging material 118 that can build up in the flowline 210. The floating workstation 206 can be an oil platform as depicted in FIG. 2 or an aquatic vessel capable of performing the same or similar wellbore operations. In some examples, the techniques described herein can also be applied to land-based context for flowline and wellbore management. The flowline 210 can range in lengths from a few hundred meters to several kilometers and can be varied depending on the operation in which the flowline 210 is being employed.

The flowline 210 can include a high temperature segment 214 and a low temperature segment 216. The low temperature segment 216 can cause the build-up of damaging material 118, such as scales, waxes, paraffins, asphaltenes, etc., that can reduce the efficiency or output of the flowline 210. The low temperature segment 216 and high temperature segment 214 can be intermittently dispersed thought the flowline 210. The flowline 210 that is located along the sea floor 212 may have one or more low temperature segments 216 that may include the damaging material 118 adhered to the inner wall of the flowline 210. The one or more low temperature segments 216 can cause multiple segments within the flowline 210 to experience reduced hydrocarbon flow. Accordingly, an exothermic reaction solution can be provided, for example in the low temperature segment 216, for removing the damaging material 118.

Figure 3:
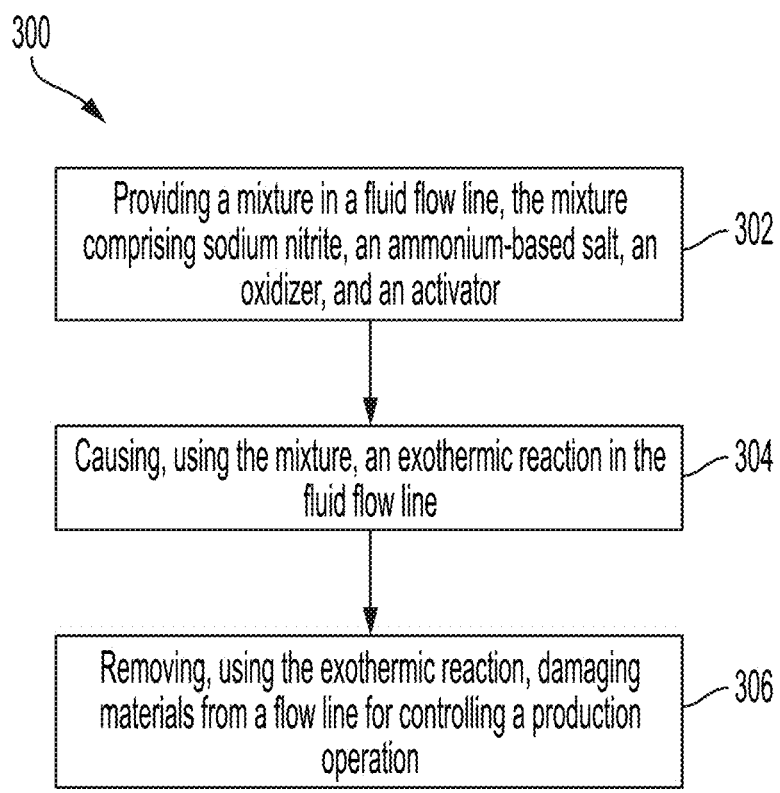
FIG. 3 is a flowchart of a process for removing damaging material from a subterranean formation, a wellbore, or a pipeline using a catalyst and an activator for an exothermic reaction according to one example of the present disclosure.

FIG. 3 is a flow chart of a process 300 for removing the damaging material 118 from the wellbore or pipeline 104 according to one example of the present disclosure. At block 302 a mixture is provided in the fluid flowline 104. The mixture can include an exothermic reaction mixture that can include sodium nitrite, an ammonium-based compound, an oxidizer, an activator, other suitable components, or any combination thereof. For example, the reaction mixture may include sodium nitrite, ammonium chloride, an oxidizer, such as sodium persulfate, ammonium persulfate, or a Lewis acid, and an activator, such as diethylene glycol diformate. Other permutations of the reaction mixture can be used. An operator of the wellbore 104 may deploy or otherwise position the tubing 112 into the wellbore 104 at a desired depth. The operator can inject the reaction mixture into the wellbore 104. In some examples, a computing device or other automatic control device can deploy the tubing 112 in the wellbore 104 and inject (or provide) the reaction mixture into the wellbore 104.

Additionally, the reaction mixture can include a buffer, a surfactant, a solvent, an acid, other well-known stimulation fluids, or any combination thereof for aiding in damage removal and controlling the exothermic reaction. For example, a buffer can be or include a combination of one or more of ammonium hydroxide, sodium bicarbonate, sodium hydroxide, potassium carbonate, ammonium acetate, acetic acid, sulfamic acid, other suitable buffer, or any combination thereof. The buffer can be added to delay the change in pH that may result from the oxidation of water that may produce hydrogen ions. The rate of the reaction can be altered to delay or increase the release of energy from the exothermic reaction by adding a surfactant to the reaction. The rate may additionally be controlled by the surfactant used or the concentration of the surfactant in the reaction mixture. For example, the surfactant can include one or more of an amphoteric surfactant, a non-ionic surfactant, an anionic surfactant, other suitable surfactants, or any suitable combination thereof.

At block 304 an exothermic reaction is caused in the fluid flowline. When the reaction mixture reaches a point of initiation, the ammonium-based compound, the sodium nitrite, the oxidizer, and the activator may react, which may cause the release of energy. The point of initiation may include the instance in which the activation energy of the reaction mixture is achieved for the transition state to occur. The activation energy of a reaction may be a property of the reactants in a reaction. The activation energy used to reach the point of initiation can include a temperature change, a pH shift, the addition of a catalyst and an activator, and the like. For example, the reaction mixture of sodium nitrite and ammonium chloride may reach the point of initiation at a temperature of 40° F. (4° C.) or at a pH at or below 5. The energy of the reaction mixture may release in the form of heat to the surrounding fluids to increase the temperature of the wellbore 104 in a select region. The ammonium-based compound can comprise an ammonium-based salt such as ammonium chloride, ammonium carbonate, ammonium acetate, ammonium phosphate, ammonium nitrate, other suitable salts, or any combination thereof. The ammonium-based compound can comprise a compound derived from ammonia, such as urea. In some embodiments, urea can react with sodium nitrite and can generate energy, released as heat, to the surrounding environment. For example, the reaction of ammonium chloride and sodium nitrite can generate nitrogen gas to increase pressure within the wellbore 104. Additionally, the reaction can generate energy, released as heat, to the surrounding environment. In the low temperature segment 116 of the wellbore 104, the reaction may not initiate without the addition of the catalyst and activator.

To initiate the reaction in a low temperature segment, a catalyst and an activator can be added to the reaction mixture. In some examples, the catalyst can be or include a low-temperature catalyst. For example, the catalyst can be an oxidizer such as sodium persulfate, ammonium persulfate, potassium persulfate, potassium dichromate, potassium percarbonate, sodium percarbonate, other suitable catalyst, a Lewis acid, or any suitable combination thereof. For example, sodium persulfate in water can generate sulfate anions and hydrogen ions. As the sodium persulfate oxidizes water, the sodium persulfate can generate the sodium ions, the hydrogen ions, and the sulfate ions. Additionally, hydrogen ions can reduce the pH to below 5 thereby initiating the reaction of the ammonium-based compound and the sodium chloride. The hydrogen ions can be used to catalyze the reaction of ammonium chloride and sodium nitrite. In some examples, to delay the oxidation of the water to generate the hydrogen ions, the oxidizer may be encapsulated in a soluble polymer for delayed release. As the polymer is solubilized in a liquid the oxidizer may be released and may start generating hydrogen ions to further catalyze the reaction between sodium nitrite and an ammonium-based compound.

In some examples, the oxidizer can be added as a solid to the reaction mixture of sodium nitrite and the ammonium-based compound. The oxidizer can include, for example, sodium persulfate that can be added in a solid form to the reaction mixture. The sodium persulfate may additionally be dissolved first in a solution before being added to the reaction mixture of sodium nitrite and the ammonium-based compound. In some examples, the sodium nitrite may be first dissolved in a solution before being added to the reaction mixture with an ammonium-based compound. Additionally, the ammonium-based compound may be first dissolved in a solution before being added to the reaction mixture. The solution may include one or more of water, fresh water, produced water, brine, other flow back fluids, organic solvents, inorganic solvents, etc. In some cases, the solution may include minerals, salts, hydrocarbons, or viscosity modifying additives such as guar, polyacrylamide, cellulose-derived polymers, and the like.

In some embodiments, the catalyst that comprises an oxidizer may be included in the exothermic reaction for initiating the exothermic reaction in a low temperature zone of a fluid flowline at a rate of from about 11 lbs/gal (1319 g/L) to about 50 lbs/gal (5992 g/L). For example, the catalyst can be included at a rate of from about 11 lbs/gal, about 12 lbs/gal, about 13 lbs/gal, about 14 lbs/gal, about 15 lbs/gal, about 16 lbs/gal, about 17 lbs/gal, about 18 lbs/gal, about 19 lbs/gal, about 20 lbs/gal, about 21 lbs/gal, about 22 lbs/gal, about 23 lbs/gal, about 24 lbs/gal, about 25 lbs/gal, about 26 lbs/gal, about 27 lbs/gal, about 28 lbs/gal, about 29 lbs/gal, about 30 lbs/gal, about 31 lbs/gal, about 32 lbs/gal, about 33 lbs/gal, about 34 lbs/gal, about 35 lbs/gal, about 36 lbs/gal, about 37 lbs/gal, about 38 lbs/gal, about 39 lbs/gal, about 40 lbs/gal, about 41 lbs/gal, about 42 lbs/gal, about 43 lbs/gal, about 44 lbs/gal, about 45 lbs/gal, about 46 lbs/gal, about 47 lbs/gal, about 48 lbs/gal, about 49 lbs/gal, or from about 50 lbs/gal.

In some examples, the catalyst that comprises an oxidizer can be a Lewis acid. The Lewis acid can include divalent or trivalent metal cations, or similar material. For example, the Lewis acid can be zinc sulfate. In some embodiments, the zinc sulfate can be a hydrated form known as zinc sulfate heptahydrate or any acceptable salt. A Lewis acid can be a chemical compound that is an electron acceptor. In solution, the divalent or trivalent metal cation may aid in initiation of the exothermic reaction through weak binding of the metal ion with water thus promoting the initiation of the exothermic reaction at low temperatures.

In some embodiments, the activator can be added in combination with the catalyst for initiating the exothermic reaction in the low temperature zones. For example, the activator can be diethylene glycol diformate. In some embodiments, the activator may not be added with the catalyst to initiate the exothermic reaction. In some embodiments, the activator may be added to the exothermic reaction as a concentration of about 0 wt. % to about 20 wt. % or more wt. % by weight of the reaction mixture. For example, about 0 wt. %, 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, or more wt. % by weight of the reaction.

Other techniques for delaying the exothermic reaction by use of the catalyst can include encapsulating the catalyst in a soluble polymer. Upon addition to the mixture, the polymer may be solubilized, and the catalyst can be released into the mixture. Alternatively, the exothermic reaction mixture can be delayed by adding, to the mixture, a crystalline form of the catalyst. The crystalline form can include larger particles that may take an increased time to dissolve. The increased time can increase the delay of the exothermic reaction mixture.

At block 306, damaging material is removed, using the exothermic reaction, from the fluid flowline for controlling a production operation or any other suitable wellbore operation. The exothermic reaction mixture can generate heat upon reacting, increase the temperature of the low temperature segment 116, and break down, dissolve, or thin down the damaging material such that it can be removed from the tubular or flowline 106 of the wellbore 104. For example, the increase in heat caused by the exothermic reaction can cause the damaging material to be removed from the wellbore 104. The exothermic reaction of an ammonium-based compound and sodium nitrite, or other suitable reactants for the exothermic reaction, can generate nitrogen gas. For example, nitrogen gas can be generated from the exothermic reaction and can create a pressure increase in the wellbore. The pressure change may aid in removing damaging material from the wellbore. The damaging material, once released from the tubular or flowline 106, after the exothermic reaction, can be pumped from the wellbore 104 or can be returned to the subterranean formation 102.

Figure 4:
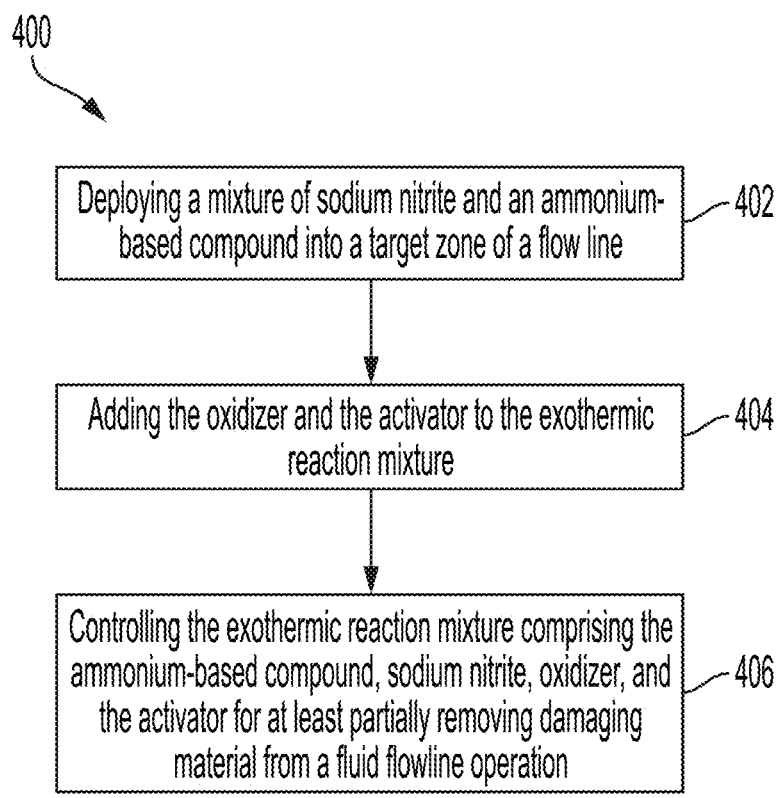
FIG. 4 is a flowchart of a process for injecting an exothermic reaction mixture, a catalyst, and an activator into a target zone of a flowline or into a pipeline for removing damaging material from the wellbore or pipeline according to one example of the present disclosure.

FIG. 4 is a flowchart of a process 400 for injecting an exothermic reaction mixture into a fluid flowline according to one example of the present disclosure. At block 402 a reaction mixture is deployed into a target zone of the flowline. The target zone can include the low temperature segment 116 within the tubular or flowline 106 in the wellbore 104. Additionally, the target zone may be a segment within the tubular or flowline 106 where the flow of a hydrocarbon fluid has been decreased from a normal flow rate. The reaction mixture can be deployed to the target zone using the tubing 112. For example, the wellbore operator or automatic control device may determine an area of low temperature and designate the area as the low temperature segment 116. Additionally, the low temperature segment 116 may be located by a reduced pressure flow through the wellbore 104 due to the damaging material 118 on the tubular or flowline 106. The reaction mixture may be injected into the tubular or flowline 106 within the wellbore 104 through the tubing 112. The tubing 112 may be in fluid communication with the fluid pumps 110 at the surface 108. The mixture of sodium nitrite and ammonium-based compound may not initiate an exothermic reaction in the low temperature segment 116.

At block 404 a catalyst, such as an oxidizer, and an activator can be added to the sodium nitrite and ammonium-based compound mixture. The oxidizer in water may generate hydrogen ions (H+) that can catalyze the reaction of sodium nitrite and the ammonium-based compound at low temperatures. The activator may initially react with the resulting hydrogen ions an initiate the exothermic reaction. For example, the ammonium-based compound can be urea. The reaction between urea and sodium nitrite can generate energy in the form of heat that can be released to the surrounding environment. In some examples, the oxidizer can be added in a concentration that may depend on the reaction mixture of sodium nitrite and the ammonium-based compound. The oxidizer can initiate the reaction at a temperature below approximately 90° F. (32° C.). For example, the oxidizer can initiate the reaction at a temperature at or below 80° F. (26° C.), at or below 70° F. (21° C.), at or below 60° F. (15° C.), at or below 50° F. (10° C.), or at or below 39° F. (4° C.).

In some examples, the concentration of the sodium nitrite and the ammonium-based compound can be adjusted to increase the temperature release from the reaction. For example, the reaction mixture can be a 1:1 ratio of sodium nitrite to ammonium-based compound. Additionally, the reaction mixture may be 1:2, 1:3, 1:4, 2:1, 3:1, or 4:1 respectively or any variation or deviation thereof.

At block 406 the exothermic reaction mixture comprising the ammonium-based compound, sodium nitrite, the oxidizer, and the activator is controlled for removing the damaging material 118 from a fluid low line operation. The reaction of the ammonium-based compound and sodium nitrite may not initiate when the pH measures above 5 or if the temperature of the wellbore drops below 70° F. (21° C.). In both situations, adding the oxidizer and the activator can allow for the reaction to initiate and to generate the heat that may be used as an aid in removing the damaging material. To control the rate of the reaction, other solutions or material can be added to the reaction mixture. The other solutions or material can include buffers, surfactants, solvents, and other suitable solutions or material.

Buffers can be used to limit the change in pH of a liquid when adding another liquid to the reaction mixture. A buffer can be added to the exothermic reaction mixture to delay the pH change from alkaline to acidic when the oxidizer is introduced. For example, an oxidizer, such as sodium persulfate, can be added to water and can generate sulfate anion and hydrogen ions. The release of the hydrogen ions can change the pH from an alkaline pH to an acidic pH. A buffer can be added to the oxidizer solution to reduce the pH change as water is oxidized and control the pH of the liquid solution. Over time, as the oxidizer continues to interact with water, the pH may gradually become more acidic and can thereby delay the reaction between the sodium nitrite and the ammonium-based compound. For example, the buffer can be a combination of one or more of ammonium hydroxide, sodium bicarbonate, sodium hydroxide, potassium carbonate, ammonium acetate, acetic acid, or sulfamic acid.

The surfactant can be added to the exothermic reaction mixture to trap pockets of the oxidizer within the surrounding liquid film layer. The surfactants can allow a large surface area interface between the oxidizer and the reaction mixture. The increased surface area interaction can be energetically stable. The surfactant can lower the interfacial tension between the liquid component of the ammonium-based compound and the liquid component of the sodium nitrite. Such an aspect may allow the ammonium-based compound and sodium nitrite solutions to increase respective mobilities and increase respective rates of interaction. For example, the surfactant can include an amphoteric surfactant, a non-ionic surfactant, an anionic surfactant, other suitable surfactants, or any suitable combination thereof.

The solvent used can include xylene, toluene, benzene, or other high-solvency liquids to aid in removing the damaging material 118 from the wall of the tubular or flowline 106 within the wellbore 104. For example, toluene can increase the generation of ions within the reaction mixture by increasing the rate at which the ammonium-based compound and sodium nitrite dissociate. Additionally, or alternatively, the solvent may not impact the heat generated by the exothermic reaction while causing a change in the rate of reaction. The solvent may help solubilize the damaging material 118 (at higher temperatures).

Figure 5:
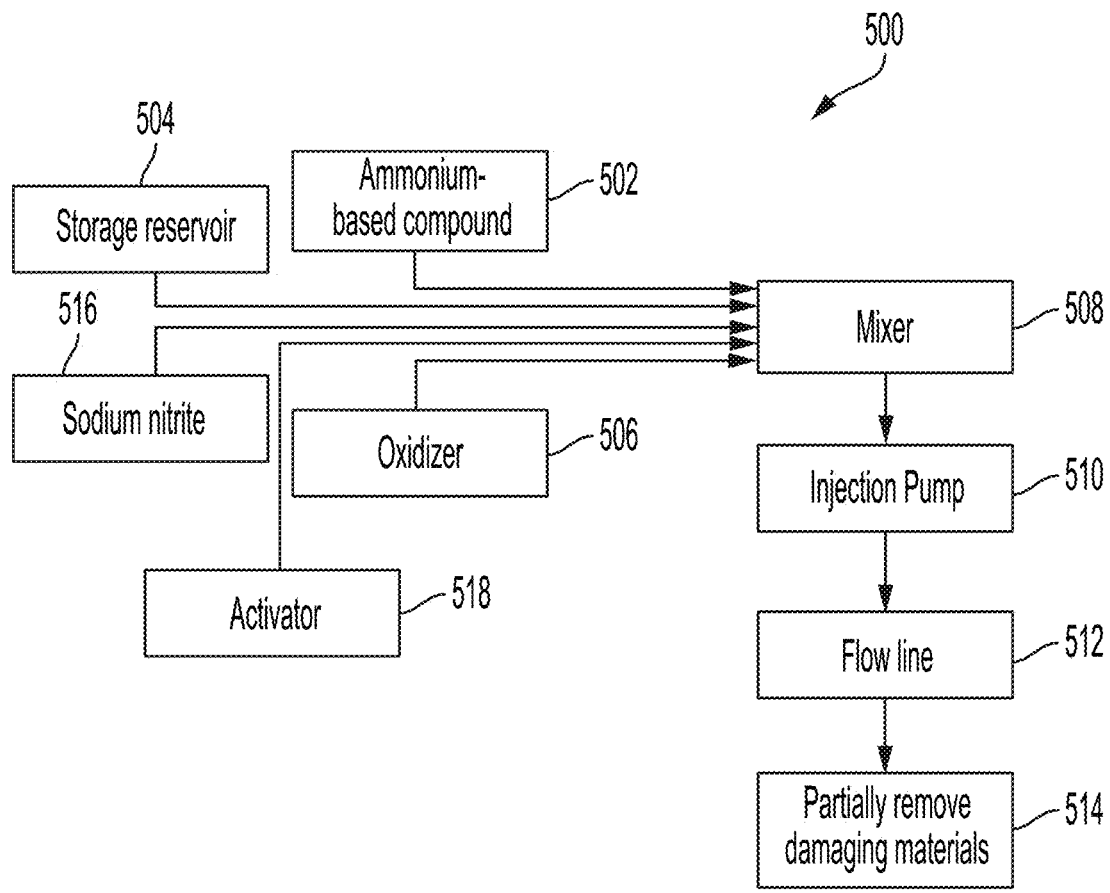
FIG. 5 is a block diagram of a process flow for using an exothermic reaction mixture, a catalyst, and an activator to remove damaging material such as paraffin and asphaltenes from a subterranean formation, a wellbore, or a pipeline according to one example of the present disclosure.

FIG. 5 is a block diagram of a process flow 500 for using an exothermic reaction mixture and a catalyst to remove damaging material from the wellbore 104 according to one example of the present disclosure. The process may involve one or more reservoirs for storing the ammonium-based compound 502, sodium nitrite 516, oxidizer 506, activator 518, and one or more of the buffer, solvents, and surfactant additives, via storage reservoir 504. The reservoirs can be in fluid connection with a mixer 508 that contacts the oxidizer 506, ammonium-based compound 502, and sodium nitrite 516 to form the exothermic reaction mixture having the catalyst that comprises the oxidizer 506 and the activator 518. The mixture can be in fluid communication with the injection pump 510 to inject the mixture fluid into the flowline 512. The storage reservoir 504 can be used for the buffer, solvent, surfactant, or combination thereof and can be added to the mixer 508 to control the exothermic reaction. The reaction mixture can be injected into the flowline 512 for at least partially removing damaging materials 514 from the flowline 512. For example, the sodium nitrite 516 can be dissolved to form a solution of nitrite ions. The solution of sodium nitrite ions can be mixed with a solution of ammonium ions to form the exothermic reaction mixture. The exothermic reaction mixture (including nitrite ions and ammonium ions) can be mixed with a solution including the oxidizer and the activator. The solution including the oxidizer, nitrite ions, ammonium ions, and activator can be mixed in the mixer 508 before being injected into the wellbore or flowline 215 through the injection pump 510.

In some examples, the reaction mixture can include the ammonium-based compound, the sodium nitrite, the oxidizer, and the activator for delayed release of the energy. In some embodiments, the reaction mixture can include the sodium nitrite, the ammonium-based compound, the oxidizer, the activator, and a solvent to reduce the delay in the reaction and generate the energy release faster. The increased reaction rate, for example, can be used when the low temperature segment 116 is closer to the surface and may not involve a long delay. Additionally, the oxidizer 506, the activator 518, and buffer that can be in the storage reservoir 504 can be injected into the wellbore or flowline 512 at a time following the initial injection of the ammonium ion and nitrite ion solution that forms the exothermic reaction mixture.

In some examples, a buffer can be added to the reaction mixture to delay the exothermic reaction. Alternatively, the storage reservoir 504 can be used for a surfactant. The surfactant can control the rate or the reaction by increasing the interactions between the ammonium-based compound and the sodium nitrite. Additionally, or alternatively, the surfactant can delay the reaction between the ammonium-based compound and the sodium nitrite by generating micelles in the mixture. The micelles may act as an encapsulating agent whereby within the interior of the micelles the oxidizer can be trapped. In low temperature zones, the micelles can prevent the oxidizer from acting as a catalyst in the reaction and can delay the energy release of the reaction.

In one or more examples, the ammonium-based compound, the oxidizer, the activator, and the sodium nitrite may be dissolved in a solution. The solution may be water, fresh water, produced water, brine, organic or inorganic solvents, or other flow-back fluids. In some examples, the solution may include minerals, salts, hydrocarbons, or viscosity-modifying additives such as guar, polyacrylamide, or cellulose-derived polymers.

Figure 6:
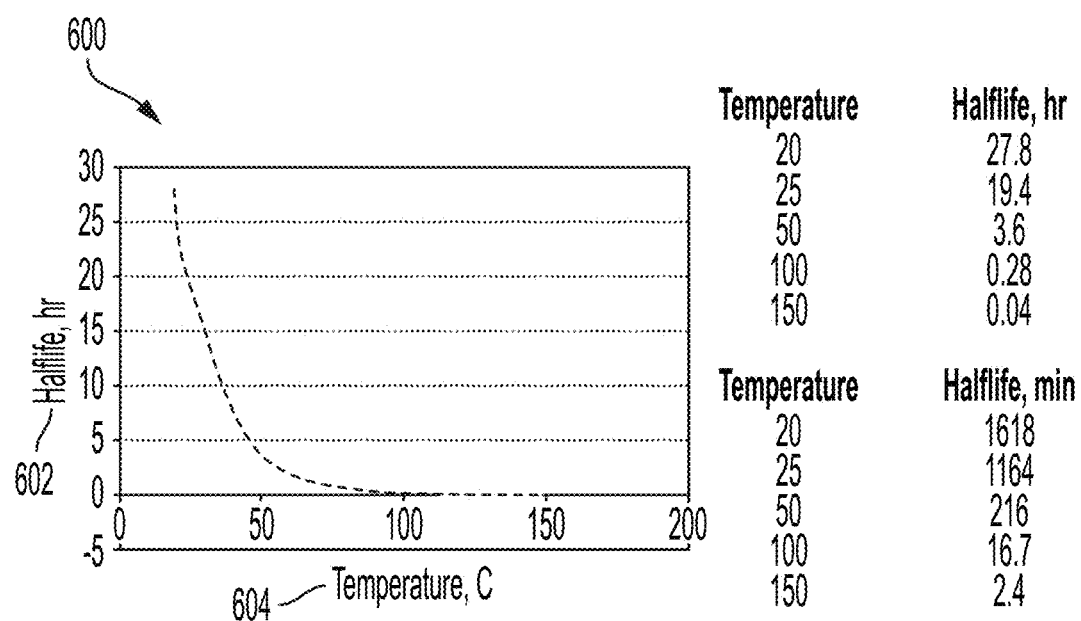
FIG. 6 is a graph of the time required for the hydrolysis of diethylene glycol diformate at different temperatures according to one example of the present disclosure.

FIG. 6 is a graph of the time required for the hydrolysis of diethylene glycol diformate at different temperatures according to one example of the present disclosure. The sample half-life may be the y-axis, and the temperature 604 may be the x-axis. The time required for hydrolysis of diethylene glycol diformate may be illustrated by the graph 600. As illustrated, the hydrolysis of diethylene glycol diformate depend upon the temperature of the current environment. For example, at temperatures of 20° C. and 25° C., the half-life may be 27.8 hours and 19.4 hours, respectively. Additionally, at temperatures above 50° C., such as 100° C., the half-life may be 16.7 minutes. The reaction in low temperature segments, such as in a low temperature segment of a fluid flowline, may not initiate upon the addition of diethylene glycol diformate at temperatures below 25° C. in less than 20 hours.

Figure 7A:
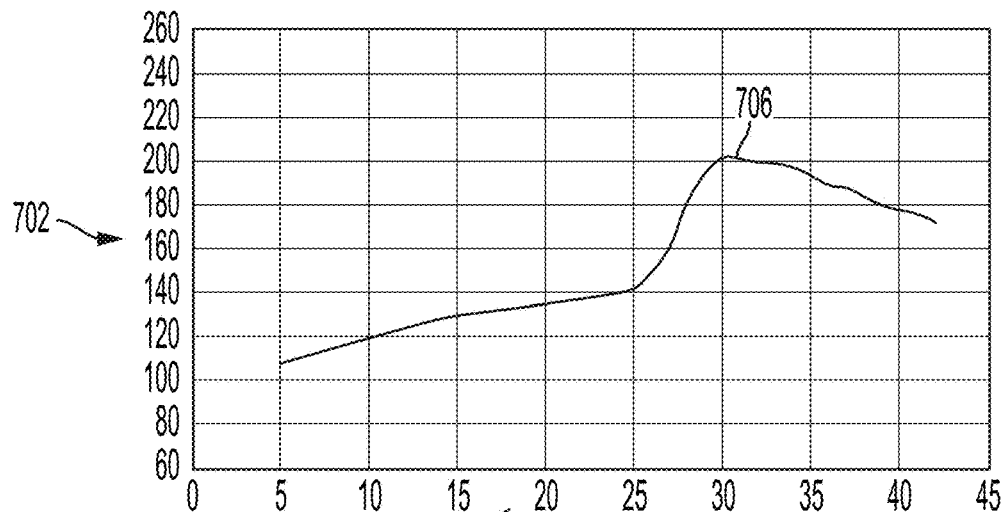
FIG. 7A is a graph of the temperature of an exothermic reaction in response to using diethylene glycol diformate at 150° F. according to one example of the present disclosure.

FIG. 7A is a graph of the temperature of an exothermic reaction in response to using diethylene glycol diformate at 150° F. according to one example of the present disclosure. The sample temperature (OF) 702 may be the y-axis and the time (min) 704 may be the x-axis. The graph illustrates the temperature at which the exothermic reaction may occur in the presence of only using the activator, diethylene glycol diformate. The graph demonstrates that the exothermic reaction in the presence of the activator alone 706 may not initiate the exothermic reaction in low temperature zones of a fluid flowline or wellbore, such as temperatures below approximately 70° F. (21° C.).

Figure 7B:
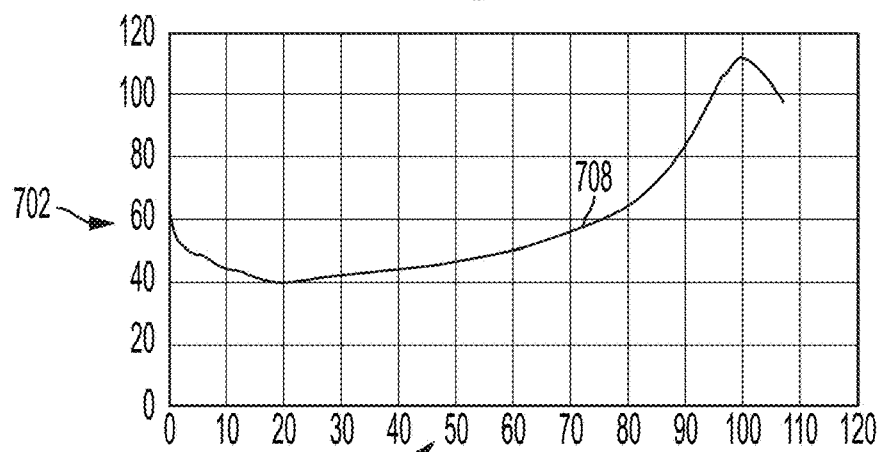
FIG. 7B is a graph of the temperature of an exothermic reaction in response to using sodium persulphate at 40° F. according to one example of the present disclosure.

FIG. 7B is a graph of the temperature of an exothermic reaction in response to using sodium persulphate at 40° F. according to one example of the present disclosure. The sample temperature 702 (° F.) 702 may be the y-axis and the time (min) 704 may be the x-axis. The graph illustrates that the exothermic reaction in the presence of the catalyst alone (sodium persulphate for example) may initiate the exothermic reaction at a temperature of about 40° F. and may reach the maximum temperature of about 110° F. after about 100 minutes. The catalyst, for example alone, at a temperature of 40° F. may initiate the reaction at a slow rate initiating at about 20 minutes and reaching the maximum temperature at about 100 minutes.

Figure 7C:
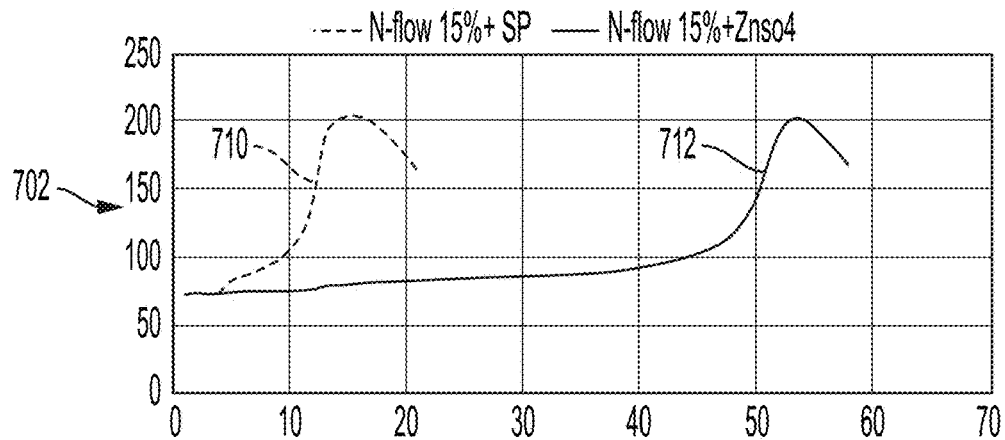
FIG. 7C is a graph of the temperature of an exothermic reaction in response to using diethylene glycol diformate in combination with sodium persulphate and diethylene glycol diformate in combination with $ZnSO_4$ according to one example of the present disclosure.

FIG. 7C is a graph of the temperature of an exothermic reaction in response to using diethylene glycol diformate in combination with sodium persulphate 710 (orange line) and diethylene glycol diformate in combination with $ZnSO_4$ 712 (yellow line) at 25° C. The sample temperature 702 (° F.) 702 may be the y-axis and the time (min) 704 may be the x-axis. The graph illustrates that the combination of the activator and a catalyst may impact the reaction rate of the exothermic reaction. For example, the combination of the activator (diethylene glycol diformate) and the catalyst (sodium persulphate) 710 may be capable of initiating the exothermic reaction in about 15 minutes. The activator in combination with an alternate catalyst ($ZnSO_4$) 712 may be capable of initiating the exothermic reaction in under 60 minutes. The exothermic reaction may reach a peak temperature of about 200° F. The results of FIG. 7C demonstrate that the combination of the catalyst and activator may be capable of initiating the exothermic reaction in a more efficient manner and at a reduced time when compared to the activator or catalyst alone, FIG. 7A and FIG. 7B, respectively. Additionally, the results demonstrate that the reaction mixture may be capable of reaching higher temperatures when compared to the activator and catalyst alone. The increased temperature may reduce the time required to remove the damaging material from the fluid flowline (i.e., the higher the temperature the faster the damaging material may release from the fluid flowline).

In some aspects, methods and mixtures for a catalyst and an activator for causing an exothermic reaction for removing damaging material from a wellbore during wellbore operations are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: forming an exothermic reaction mixture comprising sodium nitrite, an ammonium-based compound, a catalyst that-comprises an oxidizer, and an activator; and providing the exothermic reaction mixture in a fluid flow path for initiating an exothermic reaction to at least partially remove damaging material from the fluid flow path.

Example 2 is the method of example 1, wherein the ammonium-based compound comprises a compound selected from the group consisting of ammonium chloride, ammonium carbonate, ammonium acetate, ammonium phosphate, ammonium nitrate, urea, and combinations thereof, wherein the catalyst comprises a compound selected from the group consisting of sodium persulfate, ammonium persulfate, potassium persulfate, potassium dichromate, potassium percarbonate, sodium percarbonate, a Lewis acid, and combination thereof, and wherein the activator is diethylene glycol diformate.

Example 3 is the method of example 1, wherein forming the exothermic reaction mixture includes adding, to solutions of nitrite ions and ammonium ions to form the exothermic reaction mixture, a surfactant for controlling the exothermic reaction, and wherein the surfactant is an anionic surfactant, an amphoteric surfactant, or a non-ionic surfactant.

Example 4 is the method of example 1, wherein forming the exothermic reaction mixture includes adding, to solutions of nitrite ions and ammonium ions to form the exothermic reaction mixture, a buffer to the exothermic reaction mixture for delaying a progression of the exothermic reaction, and wherein the buffer comprises a compound selected from the group consisting of ammonium hydroxide, sodium bicarbonate, sodium hydroxide, potassium carbonate, ammonium acetate, acetic acid, sulfamic acid and combinations thereof.

Example 5 is the method of example 1, further comprising encapsulating the catalyst for delayed release within the fluid flow path for initiating the exothermic reaction, wherein the catalyst is a low temperature catalyst, wherein providing the exothermic reaction mixture in the fluid flow path includes initiating the exothermic reaction in the fluid flow path at a temperature below 70° F., and wherein the fluid flow path includes a pipeline, flowline, wellbore or subterranean formation.

Example 6 is the method of example 1, further comprising: determining a pH of the exothermic reaction mixture within the fluid flow path; and adding, to the exothermic reaction, the catalyst and the activator in response to determining that the pH of the exothermic reaction mixture is greater than 5.

Example 7 is the method of example 1, wherein the damaging material comprises waxes, paraffin deposits, asphaltenes, or scales that restrict flow of a hydrocarbon fluid with respect to the flowline.

Example 8 is a reaction mixture comprising: an ammonium-based compound; sodium nitrite; an activator; and a catalyst that comprises an oxidizer for initiating an exothermic reaction using the reaction mixture, the exothermic reaction controllable in a fluid flow path to at least partially remove damaging material from the fluid flow path.

Example 9 is the reaction mixture of example 8, wherein the ammonium-based compound comprises a compound selected from the group consisting of ammonium chloride, ammonium carbonate, ammonium acetate, ammonium phosphate, ammonium nitrate, urea, and combinations thereof, wherein the catalyst comprises a compound selected from the group consisting of sodium persulfate, ammonium persulfate, potassium persulfate, potassium dichromate, potassium percarbonate, sodium percarbonate, a Lewis acid, and combinations thereof, and wherein the activator is diethylene glycol diformate.

Example 10 is the reaction mixture of example 8, further comprising a surfactant, wherein the surfactant is an anionic surfactant, amphoteric surfactant, non-ionic surfactant, and wherein the surfactant controls the exothermic reaction, when added to the reaction mixture.

Example 11 is the reaction mixture of example 8, wherein the catalyst is encapsulated for delayed release within the exothermic reaction.

Example 12 is the reaction mixture of example 8, further comprising a buffer to delay initiation of the exothermic reaction, wherein the buffer comprises a compound selected from the group consisting of ammonium hydroxide, sodium bicarbonate, sodium hydroxide, potassium carbonate, ammonium acetate, acetic acid, sulfamic acid, and combinations thereof.

Example 13 is the reaction mixture of example 8, further comprising a solvent for removing the damaging material from the fluid flow path, wherein the ammonium-based compound, the sodium nitrite, the catalyst, and the activator are dissolved in the solvent, and wherein the solvent comprises a compound selected from the group consisting of toluene, xylene, benzene, and combinations thereof.

Example 14 is the reaction mixture of example 8, wherein the catalyst is a low-temperature catalyst, and wherein the exothermic reaction in the fluid flow path is initiatable at temperature below 70° F., wherein the fluid flow path includes a pipeline, flowline, wellbore or subterranean formation.

Example 15 is the reaction mixture of example 8, wherein the catalyst and the activator is addable to the reaction mixture after determining that a pH of the reaction mixture is greater than 5 for initiating the exothermic reaction.

Example 16 is a method comprising: deploying a reaction mixture of sodium nitrite and an ammonium-based compound into a target zone of a fluid flow path; adding an activator and a catalyst that includes an oxidizer to the reaction mixture; and controlling an exothermic reaction initiated using the ammonium-based compound, the sodium nitrite, and the catalyst for at least partially removing damaging material from the fluid flow path.

Example 17 is the method of example 16, wherein controlling the exothermic reaction comprises adding a buffer to the reaction mixture for controlling a progression of the exothermic reaction, and wherein the buffer comprises a compound selected from the group consisting of ammonium hydroxide, sodium bicarbonate, sodium hydroxide, potassium carbonate, ammonium acetate, acetic acid, sulfamic acid, and combinations thereof.

Example 18 is the method of example 16, wherein controlling the exothermic reaction comprises adding a surfactant to the reaction mixture for controlling the exothermic reaction, and wherein the surfactant is an anionic surfactant, an amphoteric surfactant, or a non-ionic surfactant.

Example 19 is the method of example 16, wherein deploying the reaction mixture includes adding, to a solution of nitrite ions and ammonium ions, a solvent for removing the damaging material from the fluid flow path, and wherein the solvent comprises a compound selected from the group consisting of toluene, xylene, benzene, and combinations thereof.

Example 20 is the method of example 16, further comprising: determining a pH of the reaction mixture in the fluid flow path; determining a temperature in the fluid flow path; and adding, to the reaction mixture, the catalyst in response to a pH of greater than 5 or a temperature below 70° F. for initiating the exothermic reaction, wherein the fluid flow path includes a pipeline, flowline, wellbore or subterranean formation.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
   forming an exothermic reaction mixture comprising sodium nitrite, an ammonium-based compound, a catalyst that comprises an oxidizer, and an activator that comprises diethylene glycol diformate; and
   providing the exothermic reaction mixture in a fluid flow path for initiating an exothermic reaction to at least partially remove damaging material from the fluid flow path.

2. The method of claim 1, wherein the ammonium-based compound comprises a compound selected from the group consisting of ammonium chloride, ammonium carbonate, ammonium acetate, ammonium phosphate, ammonium nitrate, urea, and combinations thereof, and wherein the catalyst comprises a compound selected from the group consisting of sodium persulfate, ammonium persulfate, potassium persulfate, potassium dichromate, potassium percarbonate, sodium percarbonate, a Lewis acid, and combination thereof.

3. The method of claim 1, wherein forming the exothermic reaction mixture includes adding, to solutions of nitrite ions and ammonium ions to form the exothermic reaction mixture, a surfactant for controlling the exothermic reaction, and wherein the surfactant is an anionic surfactant, an amphoteric surfactant, or a non-ionic surfactant.

4. The method of claim 1, wherein forming the exothermic reaction mixture includes adding, to solutions of nitrite ions and ammonium ions to form the exothermic reaction mixture, a buffer to the exothermic reaction mixture for delaying a progression of the exothermic reaction, and wherein the buffer comprises a compound selected from the group consisting of ammonium hydroxide, sodium bicarbonate, sodium hydroxide, potassium carbonate, ammonium acetate, acetic acid, sulfamic acid and combinations thereof.

5. The method of claim 1, further comprising encapsulating the catalyst for delayed release within the fluid flow path for initiating the exothermic reaction, wherein the catalyst is a low temperature catalyst, wherein providing the exothermic reaction mixture in the fluid flow path includes initiating the exothermic reaction in the fluid flow path at a temperature below 70° F., and wherein the fluid flow path includes a pipeline, flowline, wellbore or subterranean formation.

6. The method of claim 1, further comprising:
determining a pH of the exothermic reaction mixture within the fluid flow path; and
adding, to the exothermic reaction, the catalyst and the activator in response to determining that the pH of the exothermic reaction mixture is greater than 5.

7. The method of claim 1, wherein the damaging material comprises waxes, paraffin deposits, asphaltenes, or scales that restrict flow of a hydrocarbon fluid with respect to a flowline.

8. A method comprising:
deploying a reaction mixture of sodium nitrite and an ammonium-based compound into a target zone of a fluid flow path;
adding an activator and a catalyst that includes an oxidizer to the reaction mixture, wherein the activator comprises diethylene glycol diformate; and
controlling an exothermic reaction initiated using the ammonium-based compound, the sodium nitrite, the activator, and the catalyst for at least partially removing damaging material from the fluid flow path.

9. The method of claim 8, wherein controlling the exothermic reaction comprises adding a buffer to the reaction mixture for controlling a progression of the exothermic reaction, and wherein the buffer comprises a compound selected from the group consisting of ammonium hydroxide, sodium bicarbonate, sodium hydroxide, potassium carbonate, ammonium acetate, acetic acid, sulfamic acid, and combinations thereof.

10. The method of claim 8, wherein controlling the exothermic reaction comprises adding a surfactant to the reaction mixture for controlling the exothermic reaction, and wherein the surfactant is an anionic surfactant, an amphoteric surfactant, or a non-ionic surfactant.

11. The method of claim 8, wherein deploying the reaction mixture includes adding, to a solution of nitrite ions and ammonium ions, a solvent for removing the damaging material from the fluid flow path, and wherein the solvent comprises a compound selected from the group consisting of toluene, xylene, benzene, and combinations thereof.

12. The method of claim 8, further comprising:
determining a pH of the reaction mixture in the fluid flow path;
determining a temperature in the fluid flow path; and
adding, to the reaction mixture, the catalyst and the activator in response to a pH of greater than 5 or a temperature below 70° F. for initiating the exothermic reaction, wherein the fluid flow path includes a pipeline, flowline, wellbore or subterranean formation.

* * * * *